(12) United States Patent
Uno

(10) Patent No.: US 11,572,493 B2
(45) Date of Patent: Feb. 7, 2023

(54) ADHESIVE COMPOSITION

(71) Applicant: Sunstar Engineering Inc., Osaka (JP)

(72) Inventor: Atsushi Uno, Osaka (JP)

(73) Assignee: Sunstar Engineering Inc., Osaka (JP)

(*) Notice: Subject to any disclaimer, the term of this patent is extended or adjusted under 35 U.S.C. 154(b) by 827 days.

(21) Appl. No.: 16/317,312

(22) PCT Filed: Jul. 13, 2017

(86) PCT No.: PCT/JP2017/025565
§ 371 (c)(1),
(2) Date: Jan. 11, 2019

(87) PCT Pub. No.: WO2018/012593
PCT Pub. Date: Jan. 18, 2018

(65) Prior Publication Data
US 2019/0249042 A1    Aug. 15, 2019

(30) Foreign Application Priority Data

Jul. 14, 2016  (JP) .............................. JP2016-139524

(51) Int. Cl.
| | |
|---|---|
| *C09J 123/20* | (2006.01) |
| *C09J 11/08* | (2006.01) |
| *C09J 145/00* | (2006.01) |
| *C09J 123/12* | (2006.01) |
| *C09J 123/08* | (2006.01) |
| *C09J 123/00* | (2006.01) |

(52) U.S. Cl.
CPC ............ *C09J 123/20* (2013.01); *C09J 11/08* (2013.01); *C09J 123/00* (2013.01); *C09J 123/0815* (2013.01); *C09J 123/12* (2013.01); *C09J 145/00* (2013.01)

(58) Field of Classification Search
CPC .... C08J 123/20; C08J 11/08; C08J 123/0815; C08J 123/12; C08J 145/00
See application file for complete search history.

(56) References Cited

U.S. PATENT DOCUMENTS

| | | | |
|---|---|---|---|
| 6,740,711 B1 | 5/2004 | Lipman et al. | |
| 2004/0241215 A1 | 12/2004 | Lipman | |
| 2012/0259050 A1 | 10/2012 | Vitrano et al. | |
| 2015/0065638 A1 | 3/2015 | LiPiShan et al. | |
| 2016/0230055 A1 | 8/2016 | Hamann et al. | |

FOREIGN PATENT DOCUMENTS

| | | | |
|---|---|---|---|
| CN | 105308141 A | 2/2016 | |
| JP | 2-142878 A | 5/1990 | |
| JP | 11-181386 A | 7/1999 | |
| JP | 2000-512683 A | 9/2000 | |
| JP | 2003-512512 A | 4/2003 | |
| JP | 2014-514404 A | 6/2014 | |
| JP | 2015-517007 A | 6/2015 | |
| WO | WO 97/48777 | 12/1997 | |
| WO | WO 01/26700 A1 | 4/2001 | |
| WO | WO 01/30406 A1 | 5/2001 | |
| WO | WO-0130406 A1 * | 5/2001 | ........... A61L 15/585 |
| WO | WO 2009/000735 A1 | 12/2008 | |
| WO | WO 2009/000735 A9 | 12/2008 | |
| WO | WO 2014/190098 A1 | 11/2014 | |
| WO | WO-2014190098 A1 * | 11/2014 | ....... A61F 13/49009 |
| WO | WO 2016/102393 A1 | 6/2016 | |

OTHER PUBLICATIONS

International Search Report for related International Application No. PCT/JP2017/025565 dated Aug. 10, 2017.
Halimatuddahliana H. Ismail, et al., The Effects of Trans-Polyoctene Rubber and Dynamic Vulcanization on Properties of PP/EPDM/NR Blends, Progress in Rubber, Plactics and Recycling Technology, 2005, vol. 21, No. 1, p. 39-53.
International Preliminary Report on Patentability for related International Application No. PCT/JP2017/025565 dated Jan. 15, 2019.
First Office Action for corresponding Chinese patent application No. 201780043163.X dated Apr. 27, 2020 and its English translation.
Extended European Search Report for corresponding European patent application No. 17827716.6 dated Nov. 21, 2019.

* cited by examiner

*Primary Examiner* — Robert D Harlan
(74) *Attorney, Agent, or Firm* — Renner, Otto, Boisselle & Sklar, LLP

(57) ABSTRACT

The present invention provides a hot-melt adhesive having a sufficiently long usable time and exhibiting good strength and good heat resistance. The present invention relates to a hot-melt adhesive composition comprising a hydrocarbon cyclic polymer (A), an α-olefin polymer (C), and a tackifying resin (D).

10 Claims, No Drawings

ADHESIVE COMPOSITION

FIELD OF THE INVENTION

The present invention relates to a hot-melt adhesive composition comprising a hydrocarbon cyclic polymer, an α-olefin polymer, and a tackifying resin.

BACKGROUND OF THE INVENTION

Polyolefin resins such as polypropylene are conventionally widely used for automobile parts etc. because of high processability and strength. A hot-melt adhesive comprising an α-olefin polymer and a tackifying resin is widely used as an adhesive used for bonding these parts made of polyolefin resins to adherends.

Patent Document 1 proposes a hot-melt adhesive composition comprising a crystalline polybutylene having a certain melt index, a hydrogenated tackifying resin, at least one unhydrogenated tackifying resin, and a polypropylene wax.

Patent Document 2 proposes a hot-melt adhesive composition comprising a polymer having a certain α-olefin unit and a certain number of branching points per one α-olefin unit, and optionally further comprising one or more additives selected from the group consisting of a tackifier, an oil, a polymer, an antioxidant, and a UV- or thermally-activated crosslinker, which is optionally crosslinked by high energy irradiation.

Patent Document 3 proposes a hot-melt adhesive composition comprising a metallocene-catalyzed polyolefin polymer, a tackifying resin, a styrene block copolymer, and a solid plasticizer.

PRIOR ART

Patent Documents

Patent Document 1: JP H11-181386 A
Patent Document 2: JP 2000-512683 A
Patent Document 3: JP 2014-514404 A

OBJECTS OF THE INVENTION

However, it was found that, due to high crystallinity and high melting point of the α-olefin polymer used, although good strength and heat resistance are obtained, the hot-melt adhesive compositions described in Patent Documents 1 to 3 have a very short usable time, i.e., a time during which an adherend after applying an adhesive thereto can be stuck, which is within several seconds, and therefore have extremely limited uses. The present inventors also found that a heat resistance significantly decreases when the crystallinity of the polymer is reduced or a tackifying resin is added thereto in order to make the usable time longer.

An object of the present invention is to provide a hot-melt adhesive having a sufficiently long usable time and exhibiting good strength and good heat resistance.

The present inventors have intensely studied solutions for solving the above mentioned problems and have found that it is possible to improve a creep resistance at high temperature, because the addition of a hydrocarbon cyclic polymer to a hot-melt adhesive comprising an α-olefin polymer causes an entanglement of a polymer chain of another resin with a polymer chain of the hydrocarbon cyclic polymer, and thereby the movement of the other resin in an adhesive after application is restrained. The present invention has been completed based on the above finding.

SUMMARY OF THE INVENTION

The present invention includes the following:

[1] A hot-melt adhesive composition comprising a hydrocarbon cyclic 10. polymer (A), an α-olefin polymer (C), and a tackifying resin (D).

[2] The hot-melt adhesive composition according to the [1], wherein the hydrocarbon cyclic polymer (A) has a weight-average molecular weight of 200 to 3,000.

[3] The hot-melt adhesive composition according to the [2], wherein the content of the hydrocarbon cyclic polymer (A) is within the range of 0.02 to 5% by weight, based on the total weight of the composition.

[4] The hot-melt adhesive composition according to any one of the [1] to [3], wherein the hydrocarbon cyclic polymer (A) is a cyclic trans-polyoctenemer.

[5] The hot-melt adhesive composition according to any one of the [1] to [4] comprising the hydrocarbon cyclic polymer (A) as a mixture with a linear polymer (B) formed from the same monomer as the monomer constituting the hydrocarbon cyclic polymer (A).

[6] The hot-melt adhesive composition according to the [5], wherein the mixture of the hydrocarbon cyclic polymer (A) and the linear polymer (B) has a weight-average molecular weight of 10,000 to 500,000.

[7] The hot-melt adhesive composition according to the [5] or [6], wherein the mixture of the hydrocarbon cyclic polymer (A) and the linear polymer (B) has a melting point of 30 to 160° C.

[8] The hot-melt adhesive composition according to any one of the [1] to [7], wherein the α-olefin polymer (C) is at least one selected from the group consisting of a homopolymer having an α-olefin unit, a copolymer having an α-olefin unit, and a mixture thereof.

[9] The hot-melt adhesive composition according to any one of the [1] to [8] comprising 2 to 20% by weight of the hydrocarbon cyclic polymer (A), 30 to 70% by weight of the α-olefin polymer (C), and 30 to 50% by weight of the tackifying resin (D).

[10] The hot-melt adhesive composition according to any one of the [1] to [9], wherein the hot-melt adhesive composition has a viscosity of 10,000 mPa·s to 200,000 mPa·s at a temperature of 140 to 180° C. that is a material temperature during the application of the hot-melt adhesive composition.

[11] The hot-melt adhesive composition according to any one of the [1] to [10], further comprising an adhesion improver.

[12] The hot-melt adhesive composition according to any one of the [1] to [11], wherein the α-olefin polymer (C) is a mixture of a low melt viscosity α-olefin polymer and a low MFR α-olefin polymer, wherein the low melt viscosity α-olefin polymer has a melting point of 110 to 180° C. and a melt viscosity of 1,000 to 150,000 mPa.s at 190° C., wherein the low MFR α-olefin polymer has a melting point of 80 to 180° C. and a melt flow rate of 4 to 20 g/min, and wherein a weight ratio of the low melt viscosity α-olefin polymer and the low MFR α-olefin polymer in the mixture is 50:50 to 90:10.

EFFECTS OF THE INVENTION

The hot-melt adhesive of the present invention provides a sufficiently long usable time and good strength and heat resistance, and is therefore usable in various uses such as bonding of parts in an in-line process. Additionally, sufficient strength and heat resistance are obtained even when an α-olefin polymer having a relatively low melting point is used as a main component, and it is possible to lower a temperature of application to an adherend.

DETAILED DESCRIPTION OF THE INVENTION

A hot-melt adhesive composition of the present invention comprises a hydrocarbon cyclic polymer (A), an α-olefin polymer (C), and a tackifying resin (D).

The hydrocarbon cyclic polymer (A) is not particularly limited as long as the polymer is a cyclic polymer having a linear or branched saturated or unsaturated hydrocarbon as a repeating unit. Examples thereof include cyclic unsaturated polyolefin having as a repeating unit a linear unsaturated hydrocarbon such as butene, pentene, hexene, octene, decene, undecene, dodecene, tetradecene, hexadecene, octadecene, and eicosene and/or a branched unsaturated hydrocarbon such as methyl propene, methyl pentene, methyl hexene, and dimethyl hexene. In the present invention, these may be used alone or in combination of two or more. The hydrocarbon cyclic polymer (A) also includes a compound having a relatively low molecular weight, for example, a dimer and a trimer of a monomer constituting the repeating unit. The hydrocarbon cyclic polymer (A) preferably has a weight-average molecular weight Mw of 200 or higher, more preferably 400 or higher, further preferably 600 or higher. The hydrocarbon cyclic polymer (A) preferably has a weight-average molecular weight of 500,000 or lower, more preferably 200,000 or lower, further preferably 100,000 or lower. When the weight-average molecular weight Mw is the above value, it is preferable because a sufficiently long usable time and good strength and heat resistance may be obtained. In the present invention, the weight-average molecular weight Mw is a value obtained by using GPC (Gel Permeation Chromatography) in polystyrene conversion.

When the hydrocarbon cyclic polymer (A) does not have a branched chain or the branched chain has a relatively low molecular weight, the hydrocarbon cyclic polymer (A) preferably has a weight-average molecular weight Mw of 200 to 3,000, more preferably 400 to 2,000, further preferably 600 to 1,500. When the hydrocarbon cyclic polymer (A) has a molecular weight within the range, the content of the hydrocarbon cyclic polymer (A) in the total composition is preferably 0.02 to 5% by weight, more preferably 0.03 to 4% by weight, further preferably 0.04 to 3% by weight.

Examples of the cyclic unsaturated polyolefin include a cyclic trans-polyoctenemer and the like. The cyclic trans-polyoctenemer is preferable because a compatibility with the α-olefin polymer is good and it is possible to improve heat resistance of the adhesive due to an entanglement of a molecular chain of a cyclic structure. The cyclic trans-polyoctenemer is a compound represented by the following General Formula (A):

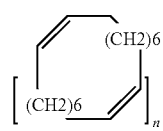

[wherein n is 1 to 30].

In a preferred embodiment of the present invention, the cyclic trans-polyoctenemer is a polymer having one double bond per 8 carbon atoms, represented by the following Formula (1):

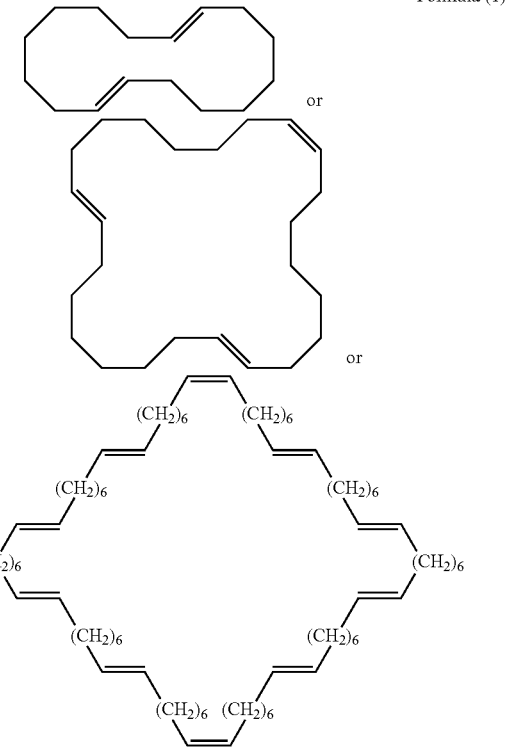

Formula (1)

The cyclic trans-polyoctenemer is usually obtained by ring-opening metathesis polymerization of a trans-isomer of cyclooctene as a mixture with a linear polymer represented by the following Formula (2):

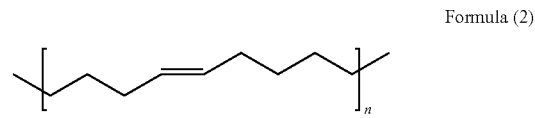

Formula (2)

[wherein n is 10 to 5000]. The cyclic trans-polyoctenemer is preferable because it catches a polymer contained in a hot-melt adhesive by an entanglement therewith due to a cyclic structure thereof, and the movement of a molecular chain is restrained to improve the heat resistance and strength.

In the adhesive of the present invention, the cyclic trans-polyoctenemer may be used alone or as a mixture with the linear polymer. When a mixture of the cyclic trans-polyoctenemer and the linear polymer is used, the content of the cyclic trans-polyoctenemer is preferably 4% by weight to 50% by weight, more preferably 10% by weight to 40% by weight, further preferably 15% by weight to 30% by weight, based on the weight of the mixture.

Representative examples of commercially available cyclic trans-polyoctenemers include VESTENAMER (registered trademark) 8012 (a mixture of a linear polymer and a cyclic trans-polyoctenemer, the content of the cyclic trans-polyoctenemer: higher than 20%, Evonic, Germany) and the like.

The hydrocarbon cyclic polymer (A) is preferably used as a mixture with a linear polymer (B) formed from the same monomer as the monomer constituting the hydrocarbon cyclic polymer (A). When a mixture of the hydrocarbon cyclic polymer (A) and the linear polymer (B) is used, the content of the hydrocarbon cyclic polymer (A) in the mixture is preferably 4% by weight or higher, more preferably 10% by weight or higher, further preferably 15% by weight or higher, based on the weight of the mixture. When a mixture of the hydrocarbon cyclic polymer (A) and the linear polymer (B) is used, the content of the hydrocarbon cyclic polymer (A) in the mixture is preferably 50% by weight or lower, more preferably 40% by weight or lower, further preferably 30% by weight or lower, based on the weight of the mixture.

The mixture of the hydrocarbon cyclic polymer (A) and the linear polymer (B) preferably has a weight-average molecular weight Mw of 10,000 or higher, more preferably 50,000 or higher, further preferably 80,000 or higher. The mixture of the hydrocarbon cyclic polymer (A) and the linear polymer (B) preferably has the weight-average molecular weight of 500,000 or lower, more preferably 200,000 or lower, further preferably 100,000 or lower. When the weight-average molecular weight Mw is the above value, it is preferable because a sufficiently long usable time and good strength and heat resistance may be obtained. In the present invention, the weight-average molecular weight Mw is a value obtained by using GPC (Gel Permeation Chromatography) in polystyrene conversion.

The hydrocarbon cyclic polymer (A), and the mixture of the hydrocarbon cyclic polymer (A) and the linear polymer (B) when the composition comprises the linear polymer (B) preferably have a melting point Tm of 30° C. or higher, more preferably 40° C. or higher, further preferably 50° C. or higher. The hydrocarbon cyclic polymer (A), and the mixture of the hydrocarbon cyclic polymer (A) and the linear polymer (B) when the composition comprises the linear polymer (B) preferably have a melting point Tm of 160° C. or lower, more preferably 100° C. or lower, further preferably 80° C. or lower. When the melting point Tm is the above value, it is preferable because it is possible to lower a temperature of application of the hot-melt adhesive and heat resistance is obtained.

The hydrocarbon cyclic polymer (A), and the mixture of the hydrocarbon cyclic polymer (A) and the linear polymer (B) when the composition comprises the linear polymer (B) preferably have a glass transition temperature Tg of −90° C. or higher, more preferably −80° C. or higher, further preferably −70° C. or higher. The hydrocarbon cyclic polymer (A), and the mixture of the hydrocarbon cyclic polymer (A) and the linear polymer (B) when the composition comprises the linear polymer (B) preferably have the glass transition temperature Tg of 60° C. or lower, more preferably 0° C. or lower, further preferably −50° C. or lower. When the glass transition temperature Tg is the above value, it is preferable because a sufficiently long usable time and good strength and heat resistance may be obtained.

The hydrocarbon cyclic polymer (A), and the mixture of the hydrocarbon cyclic polymer (A) and the linear polymer (B) when the composition comprises the linear polymer (B) preferably have a crystallinity of 10% or higher, more preferably 15% or higher, further preferably 20% or higher. The hydrocarbon cyclic polymer (A), and the mixture of the hydrocarbon cyclic polymer (A) and the linear polymer (B) when the composition comprises the linear polymer (B) preferably have a crystallinity of 100% or lower, more preferably 80% or lower, further preferably 60% or lower. When the crystallinity is the above value, it is preferable because a sufficient heat resistance and usable time may be obtained.

In the present invention, the melting point Tm, the glass transition temperature Tg, and the crystallinity may be measured with a differential scanning calorimeter, for example, DSC-60 Plus manufactured by Shimadzu Corporation.

The hydrocarbon cyclic polymer (A), and the mixture of the hydrocarbon cyclic polymer (A) and the linear polymer (B) when the composition comprises the linear polymer (B), preferably have a ratio of trans double bond/cis double bond of 50/50 to 99/1, more preferably 60/40 to 95/5, further preferably 90/10. When the ratio of trans double bond/cis double bond is a value within the above range or the above value, it is preferable because a sufficiently long usable time and good strength and heat resistance may be obtained. In the present invention, the ratio of trans double bond/cis double bond may be calculated from an IR spectral ratio.

The hot-melt adhesive composition of the present invention comprises the hydrocarbon cyclic polymer (A), and the mixture of the hydrocarbon cyclic polymer (A) and the linear polymer (B) when the composition comprises the linear polymer (B), in an amount of preferably 0.5% by weight or higher, more preferably 1.0% by weight or higher, further preferably 2.0% by weight or higher, based on 100% by weight of the hot-melt adhesive composition. The hot-melt adhesive composition of the present invention comprises the hydrocarbon cyclic polymer (A), and the mixture of the hydrocarbon cyclic polymer (A) and the linear polymer (B) when the composition comprises the linear polymer (B), in an amount of preferably 30% by weight or lower, more preferably 25% by weight or lower, further preferably 20% by weight or lower, based on 100% by weight of the hot-melt adhesive composition. When the hot-melt adhesive composition comprises the hydrocarbon cyclic polymer (A), or the mixture of the hydrocarbon cyclic polymer (A) and the linear polymer (B) in the above amount, it is preferable because a sufficient heat resistance and strength may be obtained.

Examples of the α-olefin polymer (C) include a homopolymer having an α-olefin unit, a copolymer having an α-olefin unit, and a mixture thereof.

Examples of α-olefin include propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene, which may be used alone or in combination of two or more. Among them, propylene and 1-butene are preferable.

Examples of the homopolymer having an α-olefin unit includes, for example, a homopolymer of propylene.

The copolymer having an α-olefin unit is preferably a copolymer having a structural unit derived from propylene as an olefin unit because the hot-melt adhesive having high adhesion to an adherend made of polypropylene and high heat resistance may be obtained. In such a copolymer, the structural unit derived from propylene accounts for preferably 60 mole % or higher, more preferably 70 mole % or higher, further preferably 80 mole % or higher of the structural units constituting the polyolefin. Examples thereof include copolymers of olefins with each other, such as ethylene-propylene copolymers, propylene-1-butene copolymers, ethylene-1-butene copolymers, ethylene-1-octene copolymers, ethylene-1-hexene copolymers, ethylene-propylene-1-butene copolymers. These may be used alone or in combination of two or more. A form of the copolymer may be any of random copolymerization, block copolymerization, graft copolymerization, etc.

As the α-olefin polymer (C), a mixture of an α-olefin polymer having a low melt viscosity (hereinafter also referred to as a low melt viscosity α-olefin polymer) and an α-olefin polymer having a low MFR (hereinafter referred to as a low MFR α-olefin polymer) may be used. The low melt viscosity means that the melt viscosity at 190° C. measured by using a cone-plate rotational viscometer at a shear rate of 4.3 sec$^{-1}$ is 150,000 mPa.s or lower. The low MFR means that a melt flow rate (MFR) measured at 230° C. and a load of 2.16 kg according to ASTM D1238 is 20 g/10 minutes or lower.

The weight ratio of the low melt viscosity α-olefin polymer and the low MFR α-olefin polymer in the mixture is preferably 50:50 to 90:10, more preferably 60:40 to 80:20, further preferably 65:35 to 75:25. When the weight ratio is within the above range, it is preferable because sufficient tackiness, heat resistance, and usable time may be obtained.

The low melt viscosity α-olefin polymer preferably has a melting point Tm of 110° C. or higher, more preferably 120° C. or higher, further preferably 130° C. or higher. The α-olefin polymer preferably has a melting point Tm of 200° C. or lower, more preferably 180° C. or lower, further preferably 170° C. or lower. When the melting point Tm is the above value, it is preferable because the temperature during the application of the hot-melt adhesive composition does not become too high and heat resistance may be obtained.

The low melt viscosity α-olefin polymer preferably has a melt viscosity at 190° C. of 1,000 to 150,000 mPa.s, more preferably 5,000 to 140,000 mPa·s.

When the low melt viscosity α-olefin polymer has a melt viscosity of at 190° C. within the above range, a good coating performance of the adhesive may be more easily obtained. The melt viscosity is a value measured by using a cone-plate rotational viscometer under a condition of a shear rate of 4.3 sec$^{-1}$.

The low melt viscosity α-olefin polymer preferably has a weight-average molecular weight Mw of 10,000 or higher, more preferably 20,000 or higher, further preferably 30,000 or higher. The low melt viscosity α-olefin polymer preferably has a weight-average molecular weight of 300,000 or lower, more preferably 200,000 or lower, further preferably 150,000 or lower. When the weight-average molecular weight Mw of the low melt viscosity α-olefin polymer is the above value, it is preferable because the creep resistance of the hot-melt adhesive may be improved.

The low MFR α-olefin polymer preferably has a melting point Tm of 80° C. or higher, more preferably 100° C. or higher, further preferably 130° C. or higher. The α-olefin polymer preferably has a melting point Tm of 200° C. or lower, more preferably 180° C. or lower, further preferably 170° C. or lower. When the melting point Tm is the above value, it is preferable because the temperature during the application of the hot-melt adhesive composition does not become too high and heat resistance may be obtained.

The low MFR α-olefin polymer preferably has a melt flow rate (MFR) of 4 to 20 g/10 minutes, more preferably 4 to 10 g/10 minutes, further preferably 4 to 8 g/10 minutes. When the MFR of the low MFR α-olefin polymer is the above value, it is preferable because appropriate tackiness may be obtained and good adhesion is ensured. In the present invention, the melt flow rate is measured at 230° C. and a load of 2.16 kg according to ASTM D1238.

The low MFR α-olefin polymer preferably has a weight-average molecular weight Mw of 100,000 or higher, more preferably 200,000 or higher, further preferably 300,000 or higher. The low MFR α-olefin polymer preferably has a weight-average molecular weight of 1,000,000 or lower, more preferably 750,000 or lower, further preferably 600,000 or lower. When the weight-average molecular weight Mw of the low MFR α-olefin polymer is the above value, it is preferable because the tackiness and the creep resistance of the hot-melt adhesive may be improved.

The crystallinity of the low melt viscosity α-olefin polymer is usually high crystallinity. The low melt viscosity α-olefin polymer preferably has a crystallinity of 50% or higher. When the low melt viscosity α-olefin polymer having a crystallinity of 50% or higher is used, a good coating performance of the adhesive tends to be obtained.

The crystallinity of the low MFR α-olefin polymer is usually low crystallinity. The low MFR α-olefin polymer preferably has a crystallinity of lower than 50%. When the low MFR α-olefin polymer having a crystallinity of lower than 50% is used, the resulting adhesive tends to have high tackiness.

Representative examples of commercially available products of the α-olefin polymer (C) include L-MODU (registered trademark) S400, S600, S901 (propylene polymer; Idemitsu Kosan Co.,Ltd.), RT2115A (propylene polymer; REXtac, LLC, USA), Licocene (registered trademark) PP1602, PP2602, PP3602 (propylene copolymer; Clariant (Japan) K.K.), RT2215A, RT2304A, RT2585A (ethylene-propylene copolymer; REXtac, LLC, USA), RT2715A, RT2730A, RT2780A (propylene-1-butene copolymer; REXtac, LLC, USA), TAFMER (registered trademark) XM-7070, XM-7080, XM-5070, XM-5080, PN-2070, PN-3560, PN-2060, PN-20300, PN-0040 (propylene-1-butene copolymer; Mitsui Chemicals, Inc.), VESTOPLAST (registered trademark) 308, 408, 508, 520, 608, 703, 704, 708, 750, 751, 792, 828, 888, 891, EPNC702, EP807, 206 (ethylene-propylene-1-butene copolymer; Evonic, Germany), etc.

The hot-melt adhesive composition of the present invention comprises the α-olefin polymer (C) or a mixture thereof in an amount of preferably 30% by weight or higher, more preferably 35% by weight or higher, further preferably 40% by weight or higher, based on 100% by weight of the hot-melt adhesive composition. The hot-melt adhesive composition of the present invention comprises the α-olefin polymer (C) in an amount of preferably 75% by weight or lower, more preferably 70% by weight or lower, further preferably 65% by weight or lower, based on 100% by weight of the hot-melt adhesive composition. When the hot-melt adhesive composition comprises the α-olefin polymer in an amount of 30% by weight or higher, it tends to provide sufficient heat resistance, strength, and adhesion to a polyolefin resin. When the hot-melt adhesive composition comprises the α-olefin polymer in an amount of 70% by weight or lower, good fluidity is obtained, and it tends to provide good workability.

When the α-olefin polymer (C) contains the low melt viscosity α-olefin polymer, the content of the low melt viscosity α-olefin polymer in the α-olefin polymer (C) may be 40% by weight or higher, more preferably 50% by weight or higher, further preferably 60% by weight or higher, based on the total weight of the α-olefin polymer (C). The content of the low MFR α-olefin polymer in the α-olefin polymer (C) may be 10% by weight or higher, more preferably 15% by weight or higher, further preferably 20% by weight or higher, based on the total weight of the α-olefin polymer (C).

Examples of the tackifying resin (D) include rosin resin, rosin ester, disproportionated rosin ester, hydrogenated rosin ester, polymerized rosin, aliphatic hydrocarbon resin, aliphatic aromatic copolymer resin, aromatic petroleum resin, hydrogenated petroleum resin, terpene resin, hydrogenated terpene resin, modified terpene resin, hydrogenated products of modified terpene resin, terpene phenol resin, hydrogenated terpene phenol resin, and styrene resin. These may be used alone or in combination of two or more. Among them, hydrogenated rosin ester, hydrogenated petroleum resin, hydrogenated terpene resin, and hydrogenated products of modified terpene resin are preferable because a sufficient usable time is obtained and the adhesion to polypropylene is improved.

The tackifying resin (D) preferably has a softening point Ts of 80° C. or higher, more preferably 100° C. or higher, further preferably 120° C. or higher. The tackifying resin (D) preferably has a softening point Ts of 200° C. or lower, more preferably 180° C. or lower, further preferably 160° C. or lower. When the softening point Ts is the above value, it is preferable because sufficient heat resistance and usable time may be obtained.

The content of the tackifying resin (D) in the hot-melt adhesive composition may be 10% by weight or higher, preferably 20% by weight or higher, more preferably 30% by weight or higher, further preferably 40% by weight or higher, based on 100% by weight of the hot-melt adhesive composition. When the content of the tackifying resin (D) in the hot-melt adhesive composition is 10% by weight or higher, a sufficient usable time tends to be obtained. The content of the tackifying resin (D) in the hot-melt adhesive composition may be 70% by weight or lower, preferably 65% by weight or lower, more preferably 60% by weight or lower, further preferably 50% by weight or lower, based on 100% by weight of the hot-melt adhesive composition. When the content of the tackifying resin (D) in the hot-melt adhesive composition is 70% by weight or lower, sufficient heat resistance tends to be easily obtained.

In addition to the components described above, the hot-melt adhesive composition of the present invention may further comprise an adhesion improver for the purpose of improving adhesion to a highly polar adherend.

Examples of the adhesion improver include polymers containing carboxylic acid or anhydride thereof, polymers containing an ester bond, polymers containing an amide bond, etc., which may be used alone or in combination of two or more.

Examples of the polymers containing carboxylic acid or anhydride thereof include polypropylene, propylene-1-butene-ethylene copolymer, propylene-1-butene copolymers, styrene-ethylene-butene-styrene copolymers, ethylene-vinyl acetate copolymers, ethylene-acrylate copolymers, etc. modified by introducing carboxylic acid or anhydride thereof.

Examples of the polymers containing an ester bond include polyethylene terephthalate, polytrimethylene terephthalate, polybutylene terephthalate, polyethylene naphthalate, etc.

Examples of polymers containing an amide bond include 6-nylon, 11-nylon, 12-nylon, 6,6-nylon, 6,10-nylon, 6,T-nylon, 6,1-nylon, 9,T-nylon , M5,T-nylon, poly-p-phenylene terephthalamide, poly-m-phenylene isophthalamide etc.

When the hot-melt adhesive composition of the present invention comprises the adhesion improver, the content of the adhesion improver is usually 0.1 to 20% by weight, preferably 0.5 to 10% by weight, based on 100% by weight of the hot-melt adhesive composition.

The hot-melt adhesive composition of the present invention may further contain various additives used in ordinary hot-melt adhesive compositions such as an antioxidant, a colorant, an organic solvent, a plasticizer, an inorganic filler, a polyolefin wax, etc. These additives may be used alone or in combination of two or more When the hot-melt adhesive composition of the present invention comprises an additive, the content of the additive is usually 0.1 to 20% by weight, preferably 0.2 to 15% by weight, based on 100% by weight of the hot-melt adhesive composition.

Examples of the antioxidant include hindered phenols, polyphenols, bisphenols, phosphates, thioethers, hydrotalcites, benzimidazoles aromatic secondary amines etc.

Examples of the colorant include red iron oxide, titanium oxide, carbon black, other color pigments, dyes etc.

Examples of the organic solvent include toluene, xylene, methanol, ethanol, isopropyl alcohol, butanol, acetone, methyl ethyl ketone, ligroin, ethyl acetate, tetrahydrofuran, n-hexane, heptane, and isoparaffin-based high-boiling solvents.

Examples of the plasticizer include liquid paraffin, process oil, phthalic acid-based plasticizers, polybutene, polybutadiene, and liquid rubber.

Examples of the inorganic filler include calcium carbonate, surface-treated calcium carbonate, titanium oxide, silicon oxide, talc, clay, carbon black, and glass balloon.

The hot-melt adhesive composition of the present invention may be produced by mixing the hydrocarbon cyclic polymer, the α-olefin polymer, and the tackifying resin at one time together with additives as necessary by using a mixing stirrer.

The hot-melt adhesive composition of the present invention obtained as described above has preferably a melt viscosity of 10,000 mPa·s to 200,000 mPa·s at a temperature of 140 to 180° C. that is the temperature during the application of the hot-melt adhesive composition, preferably a melt viscosity of 20,000 mPa·s to 150,000 mPa·s at more preferably a temperature of 150° C. to 170° C., preferably a melt viscosity of 30,000 mPa·s to 100,000 mPa·s at further preferably a temperature of 160° C. to 170° C. The melt viscosity within the range at corresponding temperature is preferable because dripping, uneven coating and the like are prevented during the application to the adherend. In the present invention, the melt viscosity is a value measured by using a cone-plate rotational viscometer under a condition of a shear rate of 4.3 sec$^{-1}$.

The hot-melt adhesive composition of the present invention may be heated and melted usually at a temperature of 140° C. to 200° C. before application to one surface or both surfaces of an adherend by using, for example, a spray gun, a die coater, or a roll coater.

The hot-melt adhesive composition of the present invention may be preferably used for bonding lowly polar material and highly polar material. Examples of the lowly polar material include polypropylene, polyethylene, ethylene-propylene copolymers and the like. Examples of the highly polar material include wood, paper, metal, nylon, polyester, polycarbonate, polyurethane, acrylic resin and the like.

The hot-melt adhesive composition of the present invention may preferably be used for bonding of housing interior building material such as partitions, floors, walls, and fixtures made of olefin composite material, housing exterior materials such as louvers and decorative materials made of olefin composite materials, and automobile interior materials such as ceilings, door trims, instrumental panels, dash silencers, center consoles, pillars, ornaments, rear parcels, seat sheets, and side impact pads.

The following Examples and Comparative Examples more specifically illustrate the present invention, but are not to be construed to limit the present invention thereby.

EXAMPLES

Examples 1 to 7 and Comparative Examples 1 to 3

Components in compositions shown in Table 1 were mixed by using a mixing stirrer (double-arm kneader SV-1-1 manufactured by Moriyama Seisakusho) at 180° C. to obtain hot-melt adhesive compositions.

TABLE 1

| | Example (g) | | | | | |
|---|---|---|---|---|---|---|
| | 1 | 2 | 3 | 4 | 5 | 6 |
| α-olefin polymer 1 *1 | 7 | 7 | 7 | 7 | 7 | |
| α-olefin polymer 2 *2 | | | | | | 7 |
| α-olefin polymer 3 *3 | | | | | | |
| α-olefin polymer 4 *4 | 3 | 3 | 3 | 3 | 3 | 3 |
| α-olefin polymer 5 *5 | | | | | | |
| Hydrocarbon cyclic polymer *6 | 1 | 0.5 | 4 | 1 | 1 | 1 |
| Hydrocarbon cyclic polymer *7 | | | | | | |
| Hydrocarbon cyclic polymer *8 | | | | | | |
| Tackifying resin *9 | 8 | 8 | 8 | 5 | 10 | 8 |

| | Example (g) | | | Comparative Example | | |
|---|---|---|---|---|---|---|
| | 7 | 8 | 9 | 1 | 2 | 3 |
| α-olefin polymer 1 *1 | 7 | 4 | 7 | 7 | | 7 |
| α-olefin polymer 2 *2 | | 3 | | | | |
| α-olefin polymer 3 *3 | 3 | | 3 | | | |
| α-olefin polymer 4 *4 | | 3 | | 3 | | 3 |
| α-olefin polymer 5 *5 | | | | | 10 | |
| Hydrocarbon cyclic polymer *6 | 1 | | | | 1 | 1 |
| Hydrocarbon cyclic polymer *7 | | 1 | | | | |
| Hydrocarbon cyclic polymer *8 | | | 1 | | | |
| Tackifying resin *9 | 8 | | | 8 | 8 | |

*1 VESTOPLAST (registered trademark) 888 (Evonic, ethylene-propylene-1-butene copolymer, melting point: 160° C., melt viscosity: 120,000 mPa·s (190° C.), weight-average molecular weight: 104,000)
*2 VESTOPLAST (registered trademark) EP807 (Evonic, ethylene-propylene-1-butene copolymer, melting point: 161° C., melt viscosity: 7,000 mPa·s (190° C.), weight-average molecular weight: 60000)
*3 TAFMER (registered trademark) XM5080 (manufactured by Mitsui Chemicals, Inc., propylene-1-butene copolymer, melting point: 160° C., MFR: 4.0 g/10 minutes (230° C.))
*4 TAFMER (registered trademark) PN0040 (manufactured by Mitsui Chemicals, Inc., propylene-1-butene copolymer, melting point: 160° C., MFR: 4.0 g/10 minutes (230° C.))
*5 TAFMER (registered trademark) DF110 (manufactured by Mitsui Chemicals, Inc., ethylene-propylene copolymer, melting point: 94° C., MFR: 2.2 g/10 minutes (230° C.))
*6 VESTENAMER (registered trademark) 8012 (Evonic, trans-polyoctenemer, ratio of trans double bond/cis double bond: 80/20, cyclic polymer content: 25% by weight, melting point: 54° C., glass transition temperature: −65° C., crystallinity: 27%, weight-average molecular weight: 100,000)
*7 cyclooctene polymer (cyclic and linear mixture), ratio of trans double bond/cis double bond: 80/20, low molecular weight (200-3000) cyclic-structure oligomer content: 4.8% by weight, melting point: 56° C., glass transition temperature: −65° C., weight-average molecular weight: 80,000)
*8 cyclooctene polymer (cyclic and linear mixture), ratio of trans double bond/cis double bond: 80/20, low molecular weight (200-3000) cyclic-structure oligomer content: 10% by weight, melting point: 53° C., glass transition temperature: −65° C., weight-average molecular weight: 90,000)
*9 ARKON (registered trademark) P125 (manufactured by Yasuhara Chemical Co. Ltd., hydrogenated terpene resin, softening point: 125° C.)

[Heat-Resistant Creep Test]

After the hot-melt adhesives obtained in Examples 1 to 7 and Comparative Examples 1 to 3 were applied to a surface of a fabric with urethane foam (urethane foam thickness: 2 mm$^t$) at 170° C. by using a roll coater, a polypropylene substrate (Kobe Poly-Sheet PP-N-BN manufactured by Shin-Kobe Electric Machinery Co., Ltd.) was affixed in open time of 10 seconds or 45 seconds. Subsequently, the affixed substrate was pressed at 0.05 Mpa for 5 seconds by using a hydraulic press machine. After curing at 20° C. and 65% RH for 24 hours, a load of 100 g was applied at 80° C. for 24 hours.

Subsequently, a peeling distance was measured. The results are shown in Table 2.

[Melt Viscosity]

The melt viscosities of the hot-melt adhesive compositions obtained in Examples 1 to 7 and Comparative Examples 1 to 3 were measured by using a cone-plate rotational viscometer at a temperature of 150 to 180° C. and a shear rate of 4.3 sec$^{-1}$. The results are shown in Table 2.

TABLE 2

| | | Example | | | | | |
|---|---|---|---|---|---|---|---|
| | | 1 | 2 | 3 | 4 | 5 | 6 |
| Heat-Resistant Creep | Open time: 10 seconds | 0 | 0 | 0 | 0 | 0 | 2 mm BAF |
| | Open time: 45 seconds | 1 mm BAF | 1 mm BAF | 1 mm BAF | 1 mm BAF | 1 mm BAF | 2 mm BAF |
| Melt viscosity [mPa·s] | | 10 × 10$^4$ | 11 × 10$^4$ | 9.5 × 10$^4$ | 15 × 10$^4$ | 7 × 10$^4$ | 8 × 10$^4$ |

| | | Example | | | Comparative Example | | |
|---|---|---|---|---|---|---|---|
| | | 7 | 8 | 9 | 1 | 2 | 3 |
| Heat-Resistant Creep | Open time: 10 seconds | 0 | 0 | 0 | 2 mm BAF | not bonded | not bonded |
| | Open time: 45 seconds | 1 mm BAF | 1 mm BAF | 1 mm BAF | fallen BAF | not bonded | not bonded |
| Melt viscosity [mPa·s] | | 8 × 10$^4$ | 9 × 10$^4$ | 9.5 × 10$^4$ | 11 × 10$^4$ | 30 × 10$^4$ | 25 × 10$^4$ |

BAF: Interfacial failure from base material side

As is apparent from the results shown in Table 2, the hot-melt adhesive composition of the present invention has a sufficient adhesion even when the open time is 45 seconds in the heat-resistant creep test. Therefore, it is understood that the hot-melt adhesive composition of the present invention has a sufficient usable time, and good heat resistance and good strength.

What is claimed is:

1. A hot-melt adhesive composition comprising a mixture of a hydrocarbon cyclic polymer (A) with a linear polymer (B) formed from the same monomer as the monomer constituting the hydrocarbon cyclic polymer (A); an α-olefin polymer (C); and a tackifying resin (D),
wherein the mixture of the hydrocarbon cyclic polymer (A) and the linear polymer (B) has a melting point of 30 to 160° C,
wherein the α-olefin polymer (C) is a mixture of a low melt viscosity α-olefin polymer and a low MFR α-olefin polymer,
wherein the low melt viscosity a-olefin polymer has a melt viscosity at 190° C. measured by using a cone-plate rotational viscometer at a shear rate of 4.3 sec$^{-1}$ of 150,000 mPa·s or lower, and the low MFR α-olefin polymer has a melt flow rate measured at 230° C. and a load of 2.16 kg according to ASTM D1238 of 20 g/10 minutes or lower.

2. The hot-melt adhesive composition according to claim 1, wherein the hydrocarbon cyclic polymer (A) has a weight-average molecular weight of 200 to 3,000.

3. The hot-melt adhesive composition according to claim 2, wherein the content of the hydrocarbon cyclic polymer (A) is within the range of 0.02 to 5% by weight, based on the total weight of the composition.

4. The hot-melt adhesive composition according to claim 1, wherein the hydrocarbon cyclic polymer (A) is a cyclic trans-polyoctenemer.

5. The hot-melt adhesive composition according to claim 1, wherein the mixture of the hydrocarbon cyclic polymer (A) and the linear polymer (B) has a weight-average molecular weight of 10,000 to 500,000.

6. The hot-melt adhesive composition according to claim 1, wherein the α-olefin polymer (C) is at least one selected from the group consisting of a homopolymer having an α-olefin unit, a copolymer having an α-olefin unit, and a mixture thereof.

7. The hot-melt adhesive composition according to claim 1 comprising 2 to 20% by weight of the hydrocarbon cyclic polymer (A), 30 to 70% by weight of the α-olefin polymer (C), and 30 to 50% by weight of the tackifying resin (D).

8. The hot-melt adhesive composition according to claim 1, wherein the hot-melt adhesive composition has a viscosity of 10,000 mPa·s to 200,000 mPa·s at a temperature of 140 to 180° C. that is a material temperature during the application of the hot-melt adhesive composition.

9. The hot-melt adhesive composition according to claim 1, further comprising an adhesion improver.

10. The hot-melt adhesive composition according to claim 1, wherein the low melt viscosity a-olefin polymer has a melting point of 110 to 180° C. and a melt viscosity of 1,000 to 150,000 mPa·s at 190° C., wherein the low MFR α-olefin polymer has a melting point of 80 to 180° C. and a melt flow rate of 4 to 20 g/10 minutes, and wherein a weight ratio of the low melt viscosity α-olefin polymer and the low MFR α-olefin polymer in the mixture is 50:50 to 90:10.

* * * * *